Oct. 13, 1953   J. C. MUNDAY ET AL   2,655,479
POLYESTER POUR DEPRESSANTS
Filed Jan. 3, 1949
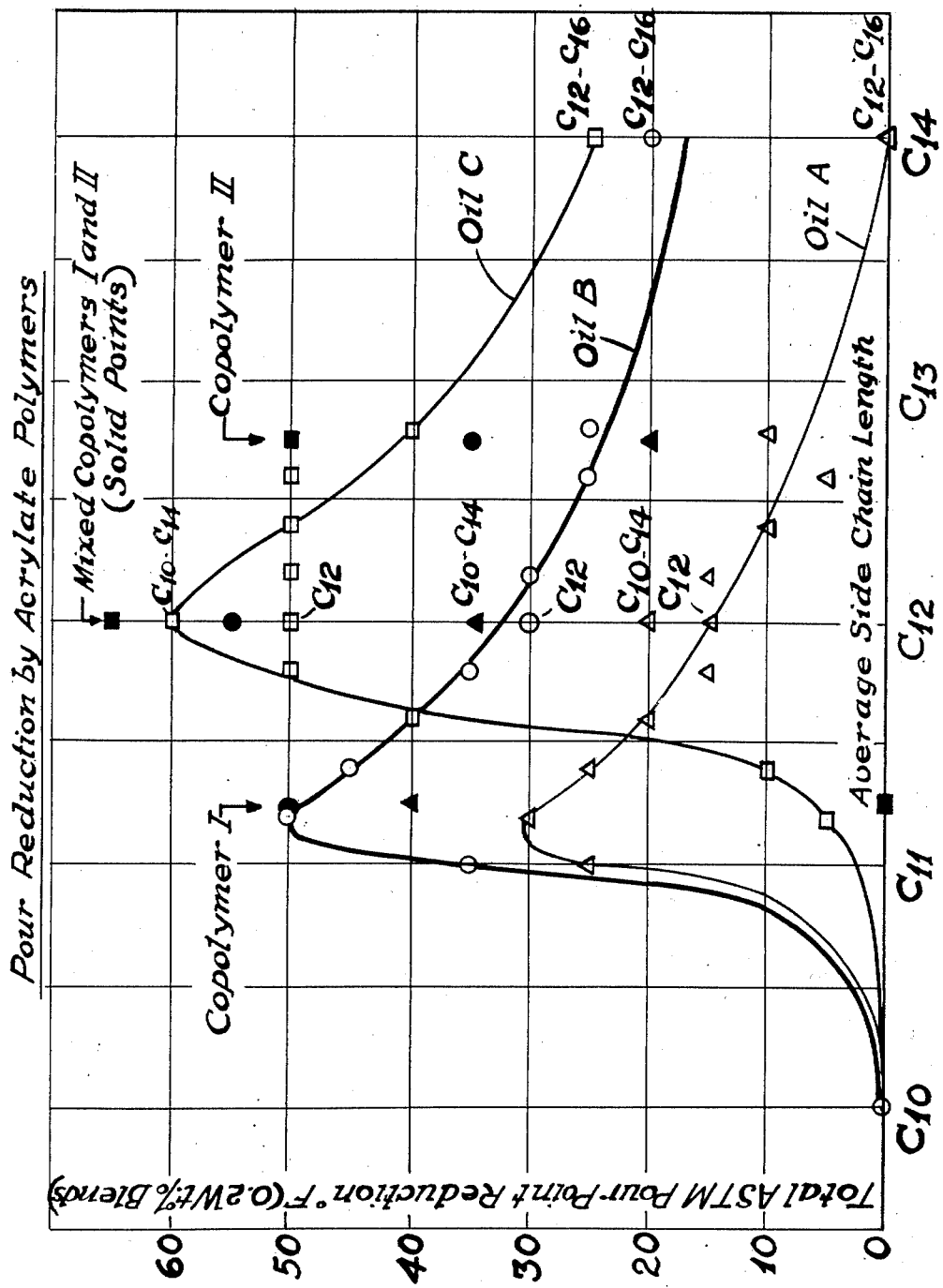
John C. Munday
Dilworth T. Rogers   Inventors
By Paul O. Dunlam   Attorney Patented Oct. 13, 1953

2,655,479

UNITED STATES PATENT OFFICE 2,655,479

POLYESTER POUR DEPRESSANTS

John C. Munday, Cranford, and Dilworth T. Rogers, Summit, N. J., assignors to Standard Oil Development Company, a corporation of Delaware Application January 3, 1949, Serial No. 68,986

8 Claims. (Cl. 252—56)

This invention relates to novel chemical products and to methods of preparing and using same, and more particularly it relates to the preparation of novel ester polymers and to their use in mineral lubricating oils especially as pour point depressants and viscosity index improvers.

One object of the present invention is the production of pour point depressors of high potency in a wide variety of lubricating oils. Another object is to produce pour depressors having good pour stability under field conditions. A further object is the production of a lubricating oil additive which not only lowers the pour point and has good pour stability but also increases the viscosity index of the oil.

It is already known that certain unsaturated esters, for example acrylate and methacrylate esters of higher aliphatic alcohols, can be polymerized to make high molecular weight products which are soluble in lubricating oils and are capable of reducing the pour point and of increasing the viscosity index thereof. A disadvantage of the pour depressors of the prior art is that although they may be very effective in reducing the pour point of some waxy lubricating oil base stocks, they may have little or no pour depressing effect in other base stocks. This is particularly true of products which have great potency in certain base stocks. It is obviously impractical for manufacturers of commercial pour depressants to supply to the trade products which are tailored to each and every type of oil. The result is that it has been necessary to be satisfied with a compromise product which has fair pour depressant properties in a large number of lubricating oil base stocks. By the present invention it is possible to prepare products which have extremely good potency in a large variety of oils.

Broadly, the invention comprises combining ester polymers in such a manner that a synergistic effect is obtained. More specifically, it has been found that mixtures of certain ester polymers exhibit pour depressant activity which is far in excess of that obtained from the individual polymers, and of what would be expected from such a mixture.

In carrying out the invention it is essential that the individual polymers which are combined be good pour depressants, and further, that they exhibit good pour depressancy in different types of oils. Synergism is obtained to the greatest degree when one of the component polymers of the mixture exhibits high potency in one type of oil and relatively little potency in another type of oil, while another of the component polymers exhibits little or no potency in the first type of oil and high potency in the second type of oil.

One explanation of the synergistic results that are obtained is based on the fact that wax which is present in oil is a mixture of compounds having relatively wide ranges of molecular weight and melting point. The ester polymers are very specific in their action and act mainly on relatively narrow wax fractions, leaving unaffected other fractions of higher or lower melting point. In a blend comprising a particular oil and a particular ester polymer, the pour point of the oil is determined by the higher or lower melting point waxes, and increasing the quantity of the polymer does not reduce the pour point and may actually increase it. If, however, there is added to the blend an ester polymer of a different type which is effective on the higher or lower melting point waxes, the pour point of the blend is markedly reduced.

The patent to Bruson, U. S. 2,091,627 contains the bare statement that mixtures of acrylate polymers may be added to lubricating oils. In this patent, however, there is no indication that the acrylate mixtures were pour point depressants and that superior results could be obtained by combining ester polymers of particular types. As will be described later, applicants have found that the use of mixtures of polymers which are unsuited for combining will give inferior rather than superior results.

In order to carry out the invention, specific knowledge of the factors which influence pour point depression by ester polymers is required. A factor which has been found to have a particularly great effect is the chain length of the alkyl side chains in the ester polymers. It will be understood that when a linear polymer is produced from an unsaturated monomeric ester, the polymerization takes place by linking of ethylenic carbons and the remainder of the monomer appears as a side chain to the linear chain. This may be illustrated by the following formula of a polymerized acrylate ester:

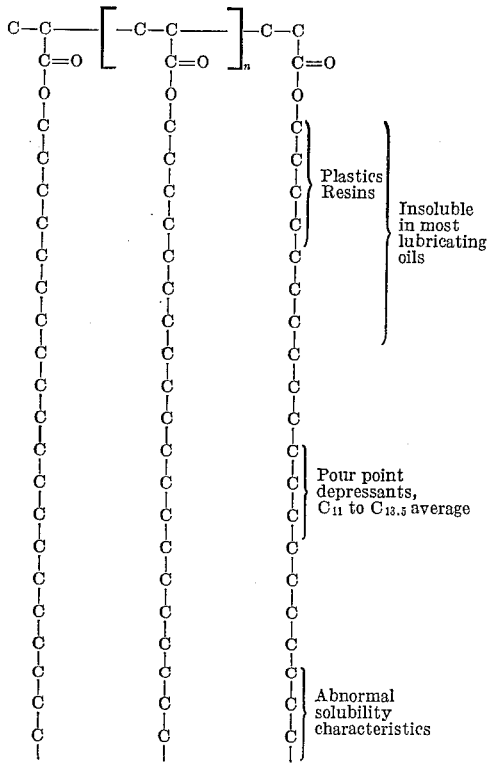

It will be appreciated from the above formula that the alkyl side chains are a considerable proportion of the molecule. The nature of the side chains has a great influence on the properties of the polymer. If the side chains are so short as to have little effect on oil solubility, say from $C_1$ to $C_4$, the polymer is resinous and oil-insoluble, and cannot be employed as pour point depressants and viscosity index improvers in lubricating oils. If the side chains are too long, say $C_{18}$ and higher, abnormalities are observed in their oil solutions. For example, oil solutions of $C_{18}$ acrylate polymers exhibit a tendency toward gelation at low temperatures such as 15° F. and below.

Furthermore, polymers of single esters are rarely pour point depressants. For example, n-octyl acrylate and n-decyl acrylate polymers show no pour point depressant activity whatsoever. n-Dodecyl acrylate polymer is a fairly good pour depressant, n-tetradecyl acrylate polymer shows slight activity in some oils and n-cetyl acrylate shows little or no activity. On the other hand, a copolymer of octyl and cetyl acrylate is quite good as a pour point depressant. Thus, certain copolymers may exhibit good pour point depressancy whereas polymers prepared from the individual esters, in this case octyl acrylate and cetyl acrylate, are completely inactive.

The aforesaid narrow ranges of effective side chain length are narrowed still further by the effect of the type of lubricating oil base stock in which the copolymers are used. This is shown graphically in Figure 1, wherein the open points represent the total ASTM pour point reduction in degrees Fahrenheit plotted against the average alkyl side chain length of a series of acrylate copolymers. The copolymers in the $C_{11}$ to $C_{12}$ range were prepared from mixtures of n-decyl acrylate and n-dodecyl acrylate. Those in the $C_{12}$ to $C_{13}$ range were prepared from n-dodecyl acrylate and n-tetradecyl acrylate. A n-dodecyl acrylate polymer, a copolymer of n-decyl and n-tetradecyl acrylates having an average of $C_{12}$ in the side chains and a copolymer of n-dodecyl and n-cetyl acrylates having an average of $C_{14}$ in the side chains, are also shown. The data were obtained in three different types of lubricating oil base stocks of the SAE 10 grade, oils A and B being solvent extracted Mid-Continent neutrals plus solvent extracted Mid-Continent bright stock, and oil C being a conveniently refined Mid-Continent neutral plus bright stock. The ASTM pour points and cloud points of the test oils differ considerably. They are as follows: oil A, pour +5° F., cloud +4° F.; oil B, pour +20° F., cloud 18° F.; oil C, pour +30° F., cloud 32° F. It will be noted that a relatively smooth curve with a decided peak is obtained in each oil. It is evident therefore that side chain length and in particular the average side chain length of the copolymers has a great effect on pour point depressancy.

Curves similar to those shown in Figure 1 are obtained with more complex copolmers, for example those prepared from three or more different unsaturated esters such as acrylates, methacrylates, fumarates, etc., or mixtures thereof. Some of the more complex copolymers exhibit greater pour depressancy than binary copolymers, and in these cases the curves are displaced vertically from the positions shown in Figure 1. Also, the peaks may occur in somewhat different positions, especially if the copolymer contains short side chains such as methyl, ethyl, propyl, butyl, etc., which have much less effect on oil solubility and pour depressant properties than chains in the $C_8$–$C_{18}$ range. Therefore, although the copolymers may contain short chains such as $C_1$ to $C_4$ which are sometimes incorporated for the purpose of improving the action of the copolymer on the viscosity index of an oil, the pour depressant properties of the copolymer will be found to depend primarily on the average length of the chains in the $C_8$ to $C_{18}$ range.

In order to obtain good pour depressancy in wide variety of oils with acrylates and with fumarates it is necessary that the average side chain length be in the range from about 11.0 to about 13.5 carbon atoms per mol monomer. The preparation of such copolymeric materials is described and claimed in the copending applications Serial No. 632,800 filed December 4, 1945, now abandoned, and Serial No. 638,435 filed December 29, 1945, now Patent No. 2,560,588, in the names of John C. Munday and Dilworth T. Rogers, of which the present application is a continuation in part. The optimum range is found to vary, however, if one of the ethylenic carbons has attached to it an alkyl group. For example, in the case of the alpha-methyl acrylates which are known as methacrylates the optimum range is from about 12.0 to about 14.5 carbon atoms per mol of monomer. Other polymers and copolymers also exhibit pour depressant activity when the average side chain length is in the $C_{11}$ to $C_{14.5}$ range, for example those of maleates, itaconates, mesaconates, citraconates, aconitates, sorbates, vinyl esters, etc., and copolymers thereof with acrylates, methacrylates, etc. which may be represented by the formula

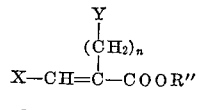

wherein X is hydrogen or COOR', Y is hydrogen or COOR, $n$ is an integer from 0 to 3 and R, R' and R'' are alkyl groups. The invention is broadly applicable to these and other polymers, copolymers, interpolymers and the like.

One commercially available alcohol suitable for the preparation of esters employed in carrying out the invention is obtained by the hydrogenation of cocoanut oil. Such products are sold under the names "Lorol," "Lorol B" and "Lorol R" and are mixtures of straight chain primary alcohols ranging from 10 to 18 carbon atoms. The weight percent compositions of these products are shown below:

|  | Lorol | Lorol B | Lorol R |
|---|---|---|---|
| $C_{10}$ | 4 | 3 | 1 |
| $C_{12}$ | 55.5 | 46 | 85 |
| $C_{14}$ | 22.5 | 24 | 13 |
| $C_{16}$ | 14 | 10 | 1 |
| $C_{18}$ | 4 | 17 |  |
| Average number of carbon atoms | 12.8 | 13.5 | 12.2 |

When employing esters of such commercial mixtures of alcohols, it is generally highly desirable or even necessary to add other single esters in order to adjust the average chain length of the alcohol groups to the proper range for pour depressant activity. For example, in the case of methacrylates, better pour depressant activity in high pour point oils may be obtained by the addition of 5 to 10% of alcohols in the $C_{16}$ to $C_{22}$ range. These alcohols can be converted to the ester, in this case the methacrylate ester, and the latter added in the desired proportion to Lorol methacrylate prior to copolymerization, or the various alcohols can be mixed and the mixture esterified. Similarly, in the case of other esters such as acrylates, short chain alcohols may be employed in conjunction with commercial alcohols such as Lorol in order to adjust the average chain length downwardly.

Straight chain or slightly branched alcohols are preferred, but more highly branched chain alcohols can be employed, for example those produced by aldol condensations. Other suitable alcohols are those produced from various olefins, carbon monoxide and hydrogen by the "Oxo" reaction. Aliphatic alcohols produced as a by-product in the synthesis of hydrocarbons from carbon monoxide and hydrogen may also be used. Primary aliphatic alcohols are preferred, but secondary alcohols and also ether alcohols such as the alkoxy derivatives of glycols and polyglycols may be used. In the case of vinyl esters, which may be prepared from acetylene and fatty acids, or from vinyl acetate and fatty acids by ester interchange, the acids may have straight chains and be derived from fatty oils, or they may be prepared synthetically, for example from straight or branched olefins, carbon monoxide and water.

The ester copolymers employed in carrying out the invention can be prepared in any suitable manner. A procedure which is suitable in most cases is to mix the desired monomeric esters in the desired proportions, then add a small amount of a catalyst, for example, a peroxide catalyst such as benzoyl peroxide, cumene hydroperoxide, tertiary butyl hydro-peroxide, etc., in concentrations ranging from 0.1 to 2%, but preferably about 0.5 to 1%, and then heat the mixture to effect the desired polymerization. Suitable temperatures may range from about 50 to 100° C. or higher, e. g., 70° C., 80° C., 85° C., etc., generally the higher temperatures requiring a shorter reaction time but giving copolymers of somewhat lower molecular weight than the lower temperatures. A preferred method of carrying out the copolymerization of highly reactive monomers such as acrylates, methacrylates, etc., is to do it in the presence of a solvent, using ester monomer concentrations in the range of about 10 to 70 volume percent, preferably about 20 to 50 volume percent. It should be noted that oil-insoluble copolymers may result if the concentration of the monomer esters is too high. In the case of less reactive monomers, more concentrated solutions such as 80 to 100% may be desirable in order to obtain higher molecular weights. Monomer purity is also a determining factor in controlling the molecular weight and oil solubility, and in making the preferred copolymers, it is best to use monomers which are substantially pure. It is also desirable to exclude molecular oxygen during the copolymerization process, as it acts as an inhibitor of polymerization. Molecular weights in the range from 1,000 to 50,000 are suitable, those in the 10,000 to 20,000 range being especially preferred because they have good viscosity index improving properties and also possess good stability toward shear and thermal breakdown.

As the solvent which was mentioned above as being desirable in some cases, one may use hydrocarbon liquids, such as toluene, heptane, refined petroleum naphtha etc. or heavier hydrocarbon oils such as a refined kerosene, gas oil or lubricating oil fraction, or one may also use oxygen-containing solvents such as alcohols e. g., methanol, isopropanol, etc., or ether, chloroform, etc. If a volatile solvent is used during the copolymerization, it may be removed after the copolymerization has been completed, by any suitable means such as distillation, evaporation, etc., with or without the use of a vacuum. When employing a volatile solvent it is best to add some lubricating oil base stock to the volatile solvent solution of the copolymer before removing the solvent; in this way, time lost in dissolving the copolymer per se in the lubricating oil is avoided. If preferred, lubricating oil base stock may be used directly as the solvent during the copolymerization step, thereby making it unnecessary to use any volatile solvent. In any case it is desirable to prepare the mixed copolymer by mixing solutions thereof when high molecular weight products are involved.

A particular feature of the mixtures of ester polymers and copolymers of the present invention is the fact that blends thereof in lubricating oil exhibit excellent pour point stability, i. e., the blends do not tend to become solid when subjected to alternate warming and cooling at temperatures above and below the normal pour and cloud points of the lubricating oil base stock. A number of commercially available pour depressors lose their potency in blends thus subjected to alternate warming and cooling during storage field tests. This may be due to absorption or occlusion by wax present in the oil during cooling, and failure to redissolve or redisperse as rapidly as the wax dissolves on warming, so that the pour depressor is not available to prevent gelation of the wax during the next cooling period. Whatever the mechanism of pour point reversion with ordinary pour depressors, the mixed ester polymers of this invention are a decided improvement.

The objects and advantages of the invention will be better understood from a consideration of the following experimental data, which are given for the sake of illustration, but without intending to limit the invention to the specific materials used.

EXAMPLE I

A copolymer was prepared from a mixture of 10 volume percent of decyl acrylate and 90 volume percent of the acrylate of Lorol B alcohol (copolymer I). This copolymer had an average side chain length of about 12.7 carbon atoms per mol of acrylate. A second copolymer was prepared from a mixture of 60 volume percent of decyl acrylate and 40 volume percent of Lorol B acrylate (copolymer II). This copolymer had an average side chain length of about 11.2 carbon atoms. The two copolymers were blended singly and also as a 50-50 mixture by weight in the three test oils described in connection with Figure 1. The ASTM pour points of the blends were determined and are shown in Table IA. The lower part of Table IA gives the total ASTM pour point depression which was obtained. These data are shown also on Figure I by the solid points.

*Table IA*

ACRYLATE COPOLYMER BLENDS

| Acrylate copolymer | ASTM pour point, ° F. | | | | | |
|---|---|---|---|---|---|---|
| | Oil A | | Oil B | | Oil C | |
| | 0.1% | 0.2% | 0.1% | 0.2% | 0.1% | 0.2% |
| None | +5 | +5 | +20 | +20 | +30 | +30 |
| Copolymer I | | −15 | | −15 | | −20 |
| Copolymer II | | <−35 | | −30 | | +30 |
| Mixture containing: 50% copolymer I, 50% copolymer II | −30 | −30 | −30 | <−35 | −30 | <−35 |

| | Total ASTM pour point depression, ° F. | | | | | |
|---|---|---|---|---|---|---|
| Copolymer I | | 20 | | 35 | | 50 |
| Copolymer II | | >40 | | 50 | | 0 |
| Mixture containing: 50% copolymer I, 50% copolymer II | 35 | 35 | 50 | >55 | 60 | >65 |

One important point to observe about the data in Table IA is that copolymer I was very effective in the high pour, high cloud oil C, but was only moderately effective in the low pour, low cloud oil A. Another point is that copolymer II was extremely effective in the low pour, low cloud oil A, but had no pour depressant action on the high pour, high cloud oil C. When these copolymers were mixed in equal proportions, the mixture was extremely effective in all three types of base stocks. It will be observed that on an overall basis better results were obtained with 0.1% of the mixture than were obtained with twice this amount of the individual components.

In order to determine whether the unexpected results which were obtained were actually due to the use of a mixture of copolymers, a copolymer III was prepared from 35 volume per cent decyl acrylate and 65 volume per cent Lorol B acrylate. This copolymer had the same average chain length as that of the 50-50 mixture of copolymers I and II. The results which were obtained on blends of the copolymer in the same three test oils are shown in Table IB.

*Table IB*

ACRYLATE COPOLYMER BLENDS

| | Total ASTM pour point depression, ° F. | | | | | |
|---|---|---|---|---|---|---|
| | Oil A | | Oil B | | Oil C | |
| | 0.1% | 0.2% | 0.1% | 0.2% | 0.1% | 0.2% |
| Copolymer III | 30 | 30 | 35 | 40 | 40 | 50 |
| Mixture containing: 50% copolymer I, 50% copolymer II | 35 | 35 | 50 | >55 | 60 | >65 |

It was concluded from this comparison that the mixture was decidedly better than the copolymer.

EXAMPLE II

Copolymers were prepared from fumarate esters of Lorol B alcohol and of decyl alcohol, by heating for about 16 hours in a nitrogen atmosphere in the presence of 1.0 weight per cent of benzoyl peroxide catalyst. The composition of the copolymers was as follows:

| | Decyl fumarate | Lorol B fumarate |
|---|---|---|
| Copolymer I | 0 | 100 |
| Copolymer II | 40 | 60 |
| Copolymer III | 60 | 40 |

The copolymers were blended singly and as 30-30 mixtures, in the three test oils in 0.2 weight per cent concentration. ASTM pour points of the blends are shown in Table II.

*Table II*

FUMARATE COPOLYMER BLENDS

[0.2 wt. percent copolymer]

| Copolymer | ASTM pour point, ° F. | | |
|---|---|---|---|
| | Oil A | Oil B | Oil C |
| None | +5 | +20 | +30 |
| Copolymer I | −5 | −15 | −15 |
| Copolymer II | −20 | −15 | −20 |
| Mixture containing: 30% copolymer I, 70% copolymer II | −20 | −25 | −30 |
| Copolymer I | −5 | −15 | −15 |
| Copolymer III | −20 | −20 | +30 |
| Mixture containing: 30% copolymer I, 70% copolymer III | −25 | −25 | −15 |

It will be observed that the mixed fumarate copolymers I and II exhibited synergism in oil B and in oil C, and that the mixed copolymers I and III exhibited synergism in oils A and B. The blends of the mixtures in oil C were also subjected to a test designed to determine the pour stability, and each blend showed good pour stability, remaining fluid at −24° F.

EXAMPLE III

A copolymer I was prepared from Lorol B fumarate, and another copolymer II was prepared from equal weights of decyl fumarate and Lorol B fumarate. The monomers employed were of different preparations from those used in Example II. Table III shows the ASTM pour points which were obtained from the individual copolymers and from a 50-50 mixture thereof in the test oils.

Table III
FUMARATE COPOLYMER BLENDS

| Copolymer | ASTM pour point, °F. | | | | | |
|---|---|---|---|---|---|---|
| | Oil A | | Oil B | | Oil C | |
| | 0.1% | 0.2% | 0.1% | 0.2% | 0.1% | 0.2% |
| None | +5 | +5 | +20 | +20 | +30 | +30 |
| I. Lorol B fumarate | −10 | −15 | −15 | −15 | −15 | −15 |
| II. Decyl fumarate, 50%; Lorol B fumarate, 50% | −20 | −25 | −30 | −30 | +30 | +15 |
| Mixture containing: 50% copolymer I 50% copolymer II | | −30 | | −30 | | −25 |

EXAMPLE IV

Two copolymers of methacrylate esters of mixed alkyl alcohols in the $C_8$–$C_{18}$ range, having molecular weights of about 15,000, were tested singly and as a 50-50 weight mixture. ASTM pour points which were obtained with 0.2 weight per cent of the copolymers in the test oils are shown in Table IV.

Table IV
METHACRYLATE COPOLYMER BLENDS

| Copolymer | ASTM pour point °F., 0.2 wt. percent blends | | |
|---|---|---|---|
| | Oil A | Oil B | Oil C |
| None | +5 | +20 | +30 |
| Copolymer I | <−35 | <−35 | +25 |
| Copolymer II | −15 | −20 | −30 |
| Mixture containing: 50% copolymer I 50% copolymer II | −25 | −25 | −30 |

It will be observed that whereas copolymer I hibited practically no activity in oil C and copolymer II was relatively weak in oil A, the mixture was a good pour depressant in all three oils.

In the above examples the synergistic mixtures contained two ester polymers, but the invention is not so limited and its advantages are achieved when three or more ester polymers are employed together. It should also be noted that good results are obtained not only when small amounts of the mixed depressants, for example 0.02 to 0.20 weight per cent, are employed primarily for pour point depression, but also when larger amounts, for example 0.5 to 10.0% are employed primarily for viscosity index improvement.

EXAMPLE V

In order to obtain the effect of synergism it is necessary to employ polymers each of which is a good pour depressor when used alone. For example, adding cetyl methacrylate (which is a poor pour depressor) to cocoanut alcohol methacrylate (which is a very good depressor in some oils), has an injurious effect, as shown by the data in Table V.

Table V
METHACRYLATE POLYMER BLENDS

| Polymer | ASTM pour points, °F. | | | | | |
|---|---|---|---|---|---|---|
| | Oil A | | Oil B | | Oil C | |
| | 0.1% | 0.2% | 0.1% | 0.2% | 0.1% | 0.2% |
| None | +5 | +5 | +30 | +30 | +20 | +20 |
| (a) Cetyl | +5 | +5 | +5 | +5 | +5 | +5 |
| (b) Lorol | −20 | <−35 | +30 | +30 | +30 | +25 |
| (c) 30–70 wt. mixture of (a) and (b) | 0 | −10 | +10 | +10 | +10 | −5 |

It is not possible to define, in terms of alkyl side chain length, all of the ester polymers which exhibit a synergistic action on mixing and which properly fall within the scope of this invention. The reason for this is that, as explained earlier, different types of ester polymers and different oils require different average side chain lengths for optimum results.

In the case of acrylates and fumarates good results are obtained when the $C_8$–$C_{18}$ side chains of one of the component polymers averages in the $C_{11}$–$C_{12}$ range, and another component polymer averages in the $C_{12}$–$C_{13.5}$ range. In the cases of methacrylate and acrylate-methacrylate copolymers the ranges are higher, for example $C_{12}$–$C_{13}$ and $C_{13}$–$C_{14.5}$. It may be noted that for a given type of polymer, good results are obtained when the $C_8$–$C_{18}$ side chains of one of the components in the mixture have an average of at least one carbon atom higher than those of another of the component polymers. The best polymers to employ are of course easily found by preparing a series of polymers of varying side chain length and testing them for pour depressant action in a number of different waxy lubricating oils. The polymers which exhibit good pour depressancy in different types of oils are then combined. The use together of two or more pour inhibitors which are similar as to composition and/or effectiveness in the same types of oils has no advantages over the use of a single depressor. But when widely different depressors are employed as mixtures, excellent results are obtained both as regards ASTM pour points and as regards pour stability.

What is claimed is:

1. A pour point depressant composition consisting essentially of a mixture of 20 to 80% of a first copolymer and 80 to 20% of a second copolymer, said first copolymer having an average side chain length of about 12.7 and being a copolymer of about 10% of an ester (a) of general formula

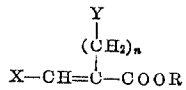

wherein X and Y are selected from the class consisting of —H and COOR, $n$ is an integer of value 0 to 1 and R is decyl, and about 90% of an ester (b) of the formula aforesaid wherein R is an alcohol radical derived from coconut oil alcohols of average chain length about 13.5, the second copolymer having an average side chain length of about 11.2 carbon atoms and being a copolymer of about 60% of ester (a) and about 40% of ester (b).

2. A composition of matter consisting essentially of a major proportion of waxy mineral oil base stock and a small but pour depressing amount of the composition of claim 1.

3. A pour point depressant composition for lubricating oils consisting essentially of a mixture of 20 to 80% of a first copolymer and 80 to 20% of a second copolymer, said first copolymer having an average side chain length of about 12.7 and being a copolymer of about 10% decyl fumarate and 90% fumaric acid ester of a mixture of alcohols derived from coconut oil and having an average chain length of about 13.5, and said second copolymer having an average side chain length of about 11.2 and being a copolymer of about 60% decyl fumarate and 40% fumaric acid ester of said alcohols derived from coconut oil.

4. A composition of matter consisting essentially of a major proportion of waxy mineral oil base and a small but pour depressing amount of the composition of claim 3.

5. A pour point depressant consisting of equal proportions of a copolymer of 10% decyl acrylate and 90% of an acrylic acid ester of a mixture of alcohols derived from coconut oil and having an average side chain length of about 13.5, said copolymer having an average side chain of 12.7 carbon atoms and a copolymer of 60% decyl acrylate and 40% of an acrylic acid ester of a mixture of alcohols derived from coconut oil and having an average side chain length of about 13.5, said copolymer having an average side chain of 11.2 carbon atoms, said pour point depressant having an average side chain of about 12.0 carbon atoms.

6. A pour point depressant consisting of equal proportions of a copolymer of 10% decyl fumarate and 90% of a fumaric acid ester of a mixture of alcohols derived from coconut oil and having an average side chain length of about 13.5, said copolymer having an average side chain of 12.7 carbon atoms and a copolymer of 60% decyl fumarate and 40% of a fumaric acid ester of a mixture of alcohols derived from coconut oil and having an average side chain length of about 13.5, said copolymer having an average side chain of 11.2 carbon atoms, said pour point depressant having an average side chain of about 12 carbon atoms.

7. A composition of matter consisting essentially of a major proportion of a waxy mineral oil base stock and a small but pour depressing amount of a pour point depressant consisting of equal proportions of a copolymer of 10% decyl acrylate and 90% of an acrylic acid ester of a mixture of alcohols derived from coconut oil and having an average side chain length of about 13.5, said copolymer having an average side chain of 12.7 carbon atoms and a copolymer of 60% decyl acrylate and 40% of an acrylic acid ester of a mixture of alcohols derived from coconut oil and having an average side chain length of about 13.5, said copolymer having an average side chain of 11.2 carbon atoms, said pour point depressant having an average side chain of about 12 carbon atoms.

8. A composition of matter consisting essentially of a major proportion of a waxy mineral oil base stock and a small but pour depressing amount of a pour point depressant consisting of equal proportions of a copolymer of 10% decyl fumarate and 90% of a fumaric acid ester of a mixture of alcohols derived from coconut oil and having an average side chain length of about 13.5, said copolymer having an average side chain of 12.7 carbon atoms and a copolymer of 60% decyl fumarate and 40% of a fumaric acid ester of a mixture of alcohols derived from coconut oil and having an average side chain length of about 13.5, said copolymer having an average side chain of 11.2 carbon atoms, said pour point depressant having an average side chain of about 12 carbon atoms.

JOHN C. MUNDAY.
DILWORTH T. ROGERS.

References Cited in the file of this patent

UNITED STATES PATENTS

| Number | Name | Date |
|---|---|---|
| 2,091,627 | Bruson | Aug. 31, 1937 |
| 2,097,263 | Strain | Oct. 26, 1937 |
| 2,125,885 | Bruson | Aug. 9, 1938 |
| 2,279,883 | D'Alelio | Apr. 14, 1942 |
| 2,403,883 | Davis | July 2, 1946 |
| 2,407,954 | Fenske | Sept. 17, 1946 |
| 2,422,881 | Blair | June 24, 1947 |
| 2,491,683 | Munday et al. | Dec. 20, 1949 |
| 2,509,203 | Bartlett | May 30, 1950 |
| 2,560,588 | Munday et al. | July 17, 1951 |

FOREIGN PATENTS

| Number | Country | Date |
|---|---|---|
| 818,740 | France | Oct. 2, 1937 |